United States Patent
Paoli et al.

[15] 3,701,044
[45] Oct. 24, 1972

[54] OPTICAL COUPLING OF ADJACENT STRIPE CONTACT GEOMETRY SEMICONDUCTOR LASERS

[72] Inventors: Thomas Lee Paoli, Chatham; Jose Ellis Ripper, North Plainfield, both of N.J.

[73] Assignee: Bell Telephone Laboratories, Incorporated, Murray Hill, N.J.

[22] Filed: June 29, 1970

[21] Appl. No.: 50,459

[52] U.S. Cl. ................331/94.5, 250/199, 330/4.3, 332/7.51
[51] Int. Cl. ................................H01s 3/18
[58] Field of Search .......331/94.5; 250/199; 330/4.3; 332/7.51

[56] References Cited

UNITED STATES PATENTS

| | | | |
|---|---|---|---|
| 3,303,431 | 2/1967 | Fowler | 331/94.5 |
| 3,402,366 | 9/1968 | Williams et al. | 331/94.5 |
| 3,436,679 | 4/1969 | Fenner | 331/94.5 |
| 3,479,614 | 11/1969 | Ashkin | 331/94.5 |

OTHER PUBLICATIONS

Niebuhr et al., IBM Tech. Discl. Bull., Vol. 6, No. 9, Feb. 1964, p. 36

Pankove, RCA Tech. Notes, No. 721, June 1967, 2 pp.

*Primary Examiner*—Ronald L. Wibert
*Assistant Examiner*—R. J. Webster
*Attorney*—R. J. Guenther and Arthur J. Torsiglieri

[57] ABSTRACT

Adjacent stripe contact geometry semiconductor lasers are optically coupled if the stripe contacts are sufficiently close that the optical fields of adjacent lasers overlap; i.e., the field of one laser penetrates the active region of adjacent lasers and/or the fields of adjacent lasers mutually interact in the lossy region between lasers. In the case of two such coupled lasers, the combination oscillates at some frequency intermediate the natural frequencies of oscillation of the two lasers taken separately. Also disclosed are several embodiments employing a plurality of parallel stripe contacts electrically divided into two sets of complementary contacts, a separate current source being connected to each set. The two sets are formed by a physical separation between the corresponding contact segments, the shape of the separation obeying a prescribed functional relationship between contact length and contact position. When, for example, the functional relationship is linear, beam scanning is produced. When the relationship is parabolic, variable beam widths are produced.

2 Claims, 5 Drawing Figures

PATENTED OCT 24 1972　3,701,044

INVENTORS: T. L. PAOLI
J. E. RIPPER

BY Michael J. Urbano
ATTORNEY

OPTICAL COUPLING OF ADJACENT STRIPE CONTACT GEOMETRY SEMICONDUCTOR LASERS

BACKGROUND OF THE INVENTION

This invention relates to semiconductor lasers and, more particularly, to optical coupling of adjacent stripe contact p-n junction lasers resulting in beam scanning and variable beam width lasers.

Early in the development of the p-n junction laser it was recognized that such lasers with broad contacts usually operate in a number of lasing filaments among which there is seldom spatial or temporal coherence. Previous attempts to obtain spatial coherence have relied either on decreasing the width of the active region to support only one filament, as is done in the stripe-geometry laser of the type described by R. A Furnanage et al. in U. S. Pat. No. 3,363,195 issued on Jan. 9, 1968, or have relied on coupling the filaments into a single external cavity.

The stripe contact configuration has found widespread use by workers skilled in the art as suggested, for example, by the issuance on Nov. 18, 1969 of U.S. Pat. No. 3,479,614 to A. Ashkin describing a tunable junction laser utilizing a plurality of parallel stripe contacts on the p-side of a monolithic structure. As discussed in column 3, lines 10 et seq. of the latter patent, a plurality of notches between the plural stripe contacts serve to confine the injection current to the region immediately below each stripe. Consequently, Ashkin teaches that applying current to first one stripe, then to two stripes and so on, such that in each case the sum of the applied currents equals the threshold current, decreases the output frequency in each case due to the reduction in current density. While Ashkin teaches the use of parallel stripe contacts to achieve frequency tuning, his lasers are not optically coupled, i.e., the width and separation of the contact stripes are not chosen to permit the optical fields of adjacent lasers to overlap in the lossy region therebetween.

It is therefore one object of the present invention to optically couple stripe contact injection lasers.

It is another object of this invention to obtain spatial coherence in a relatively broad laser source.

It is yet another object of this invention to scan the output beam of such optically coupled lasers.

It is a further object of this invention to vary the width of the output beam of such optically coupled lasers.

SUMMARY OF THE INVENTION

These and other objects are accomplished in accordance with one embodiment of our invention in which we have discovered that by a proper choice of the width and separation of a plurality of parallel stripe electrical contacts formed on one surface of a p-n junction diode, it is possible to optically couple adjacent lasers to produce locked oscillation and thereby obtain a relatively broad source with spatial coherence. Locked oscillation, i.e., simultaneous, coherent operation of two lasers at the same optical frequency, occurs as a result of the stimulated emission induced by the optical field of each laser in the active region of the other and/or as a result of the mutual interaction of the two optical fields in the lossy region between the two lasers. When so coupled, the lasers oscillate at a frequency intermediate their natural frequencies of oscillation. Under conditions of locked oscillation, the coupled lasers have a lower threshold than their simultaneous but independent oscillation (contrast Ashkin) and have a power output greater than that of a single stripe laser without loss of transverse phase coherence. Moreover, the width of the main lobe (measured at the half-power points) of such coupled lasers is narrower than for corresponding uncoupled lasers; i.e., the beam width of N coupled lasers is reduced by a factor of N.

Recognizing that the dielectric constant, and hence the natural frequency, of a laser diode is a function of the injection current level, we have discovered further that the beam direction and beam width of such an array of optically coupled lasers can be controlled.

In one embodiment, therefore, a plurality of parallel stripe contacts is divided into two sets of complementary contacts, a separate current source being connected to each set. The two sets are formed by a physical separation between the corresponding contact segments, the shape of the separation obeying a prescribed functional relationship between contact length and contact position on the diode surface. When, for example, the functional relationship is linear, beam scanning is produced. When the relationship is nonlinear (e.g., parabolic), variable beam widths are produced. In each case the beam direction or width is a function of the current density under each set of contacts and it is preferred that the sum of the lengths of corresponding contact segments in each set be equal to a constant (e.g., the sums are equal to each other).

BRIEF DESCRIPTION OF THE DRAWING

These and other objects of the invention, together with its various features and advantages, can be more easily understood from the following more detailed description taken in conjunction with the accompanying drawing, in which.

DETAILED DESCRIPTION

Basic Structure

Figure 1:
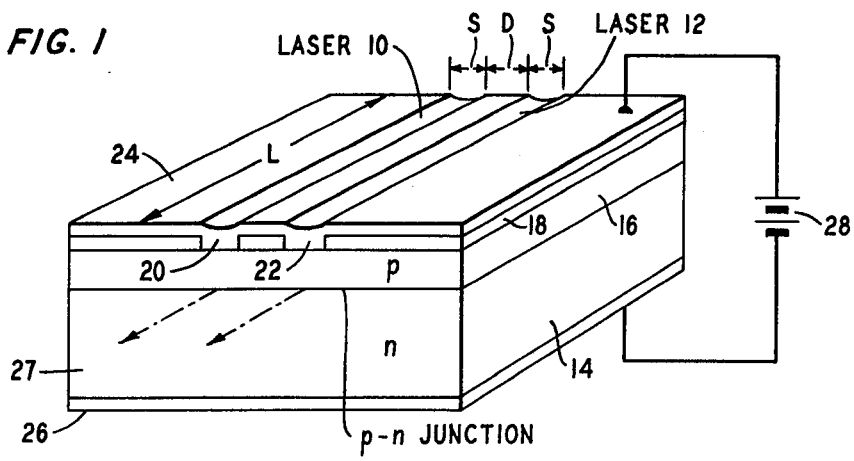
FIG. 1 is a pictorial view of two stripe contact lasers optically coupled in accordance with an illustrative embodiment of our invention.

Turning now to FIG. 1, there is shown pictorially one embodiment of our invention in which we have observed optical coupling between adjacent stripe contact lasers 10 and 12. The basic monolithic structure includes an n-type layer 14 in which is diffused a p-type layer 16. On the latter layer is deposited an insulating layer 18 which is then etched to define a pair of stripes 20 and 22 of width S and separation D. A metal film 24 is evaporated over the etched oxide to provide a common contact to both stripes, and a metal film 26 is evaporated on n-type layer 14 to allow a current source 28, shown illustratively to be a battery, to be electrically connected across the diode. In this structure, of course, the current in each stripe cannot be independently varied. It is readily possible, however, to fabricate diodes with parallel stripe contacts electrically isolated from one another, thereby permitting independent current control in each. The surface 27 and the opposite parallel surface (not shown) are typically cleaved or polished optically flat to form a resonator for sustaining the stimulated radiation generated in the plane of the junction region. A detailed description of the fabrication of this laser diode follows.

Fabrication

A gallium arsenide junction laser was fabricated in the following manner. An n-doped substrate was formed by growing a tellurium-doped crystal of gallium arsenide by the Czochralski method and slicing the crystal into wafers. The free electron concentration of the substrate was between 2 and $3.2 \times 10^{18}$ electrons per cubic centimeter. A p-doped region was diffused into the substrate using the well-known box method with a source comprising a 2.0 percent solution of zinc in gallium saturated with gallium arsenide. The diffusion time was three hours at 800° C. The depth of the junction thus formed was about 1.8 microns.

After a protective layer of about 2,000 angstroms of $SiO_2$ was applied, the electrical contacts to the n- and p-regions of the diode were formed as follows. Two stripes having dimensions 12 × 380 microns and separated by 12 microns between their edges were cut through the oxide on the p-doped region by photolithographic methods., (i.e., S=D=12 microns; L=380 microns; FIG. 1.) A second p-type diffusion was then carried out in order to make good ohmic contact to the p-doped region. (This diffusion does not alter the original diffusion and is used only to make good contacts.) This step was carried out by the box method using a pure zinc arsenide source and a diffusion time of 25 minutes at 625° C. This diffusion formed a heavily-doped layer in the p-region with a thickness of less than 3,000 angstroms. A metal contact comprising 500 angstroms of chromium and 5,000 angstroms of gold was then applied to the p-region. The n-doped side was lapped down to a thickness of about 105 microns and a film comprising 2,000 angstroms of tin and 500 angstroms of palladium was applied. This metallic film was then alloyed at 525° C for 30 seconds in a vacuum. After alloying, 7,000–9,000 angstroms of tin was applied to the contact. The substrate was then cleaved to form individual Fabry-Perot cavities having final dimensions on the order of 100 × 380 × 625 microns. For c.w. operation between 80° K and 125° K, a tin plated copper heat sink was bonded to the Cr-Au contact on the p-side and the device was mounted on a cold finger immersed in liquid nitrogen.

It should be noted that the sheet resistivity (about 100 ohm/square) of the p-layer was high enough to confine most of the current to the junction area immediately under the stripes. As a result, there was no inversion in other regions of the junction even at currents well above threshold.

Operation

A laser device shown in FIG. 1 and as fabricated by the foregoing technique but with $D = 25\mu m$ in one case and $D = 50\mu m$ in another, exhibited no coupling between the lasers 10 and 12, as each of the lasers acted independently. Due to inhomogeneities across the wafer, each laser typically had different threshold current densities and different natural frequencies. As the current was increased, one laser reached threshold first (e.g., laser 10). Its spectrum however, was unaffected when the second laser (e.g., laser 12) began to lase. With both lasers above threshold, their spectra were in general quite different with mode envelopes that peaked as much as 25 A apart. Differences in mode frequencies of about 0.3 A at about 8,444 A were also observed which corresponds to a relative difference in the refractive index of the order $4 \times 10^{-5}$.

Essentially, the same device fabricated with $D = 12\mu m$, on the other hand, exhibited strong coupling between lasers 10 and 12. As the laser with the high threshold began to lase, the modal frequencies of the laser with the lower threshold were shifted from their natural values to the frequencies at which the two lasers lock. The shift occurs because the two lasers have in general different natural frequencies, as mentioned before, so the locked frequency will be somewhere between the two natural frequencies of the unlocked lasers. The coherence of the two beams generated by locked lasers 10 and 12 was confirmed by placing an observation screen at a point in the laser far field where there is spatial overlap of the optical fields from different stripes. At such a point, steady optical interference fringes result. In addition, as the heat sink temperature was raised from about 80° K toward the maximum c.w. operating heat sink temperature (about 125° K for the above device bonded on a Cu heat sink) the coupling was weakened. Eventually, loss of coherence between the two beams was observed probably due to the increased focusing of the modes under each stripe and the increased effect of uneven heating at high temperatures and currents. Coupling can be maintained, however, at higher temperatures by narrowing the stripe separation (smaller D) and/or by fabricating a more uniform device.

CONTROL OF BEAM DIRECTION AND WIDTH

Analysis based on antenna array theory indicates that the output beam from an array of optically coupled lasers has several useful properties; namely, the power output density in the main lobe is greater than that of a single stripe laser without the loss of transverse phase coherence. In addition, electronic control at UHF rates of the direction and width of the main lobe of the output radiation pattern may be achieved by varying the relative phases of the modes of the different cavities. Such phase variations can be achieved by varying the natural frequencies of each cavity through the current dependence of the dielectric constant.

Figure 2A:
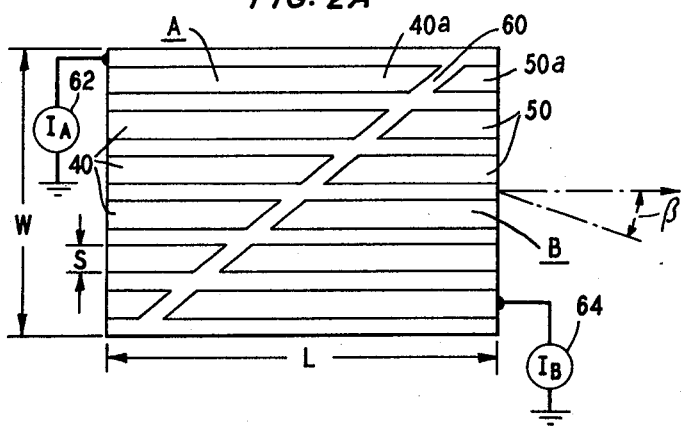
FIG. 2A is a top view of a contact array for beam scanning in accordance with another embodiment of our invention.

Thus, in a scanning laser device, as shown in FIG. 2A, adjacent coupled laser oscillators will be in phase only if their natural frequencies of oscillation are the same; if not, once coupled, adjacent lasers will oscillate at some intermediate frequency with a phase difference such that a laser with a lower natural frequency lags a laser with a higher natural frequency. Thus, by introducing phase shifts between adjacent lasers, the composite beam direction can be changed. Such phase shifts can be produced by changing the natural frequency of oscillation of each stripe laser. The latter parameter is a function of the dielectric constant of a laser diode which in turn is a function of current.

Figure 2B:
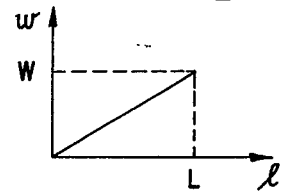
FIG. 2B is a graph of the linear function obeyed by the physical separation of the contact sets shown in FIG. 2A.

Utilizing these properties, a scanning beam laser can be fabricated as shown in FIG. 2A in which illustratively the p-layer (not shown) is provided with a plurality of stripe contacts divided into two complementary sets 40 and 50 formed by a physical separation 60. The contact segments in each set, however, are electrically connected to each other. As shown in FIG. 2B, the physical separation obeys a linear functional relationship $$\left(\text{i.e., } l = \frac{L}{W} w\right)$$

between the position $w$ of the contact stripes along the transverse dimension of the array and the length $l$ of the stripes along the longitudinal dimension thereof. Thus the sum of the lengths of a contact segment (e.g., 40a) in one set (40) and the corresponding complementary segment (e.g. 50a) in the other set (50) is constant (i.e., equal to L).

Assuming small signals so that linear approximations are valid and assuming the current densities in regions A and B are, respectively, $J_A$ and $J_B$, then the average current on the $n^{th}$ stripe will be $$I_n \simeq SL\left[J_A - \frac{n}{N}(J_B - J_A)\right] \quad (1)$$

where $S$ is the stripe width, $L$ is the cavity or stripe length and $N$ is total number of stripes. Thus, between each successive adjacent stripe there will be a constant current difference of $SL(J_B-J_A)/N$ which produces a constant phase difference $\alpha$ between outputs of adjacent lasers that is proportional to $(J_B-J_A)$.

The composite output beam has a main lobe in the direction $\beta$ such that $$\sin \beta = (\alpha\lambda)/(2\pi d) \quad (2)$$

where $\alpha$ is the phase difference measured in radians, $\beta$ is measured from the direction normal to the laser mirrors as shown in FIG. 2A, $d$ is the distance between the center lines of adjacent stripes (i.e., $d = S+D$), and $\lambda$ is the wavelength of the locked output oscillation.

If the current density in each region generated by current sources 62 and 64 is given by $$J_A = J_o + af(t) \text{ and} \quad (3)$$

$$J_B = J_o - af(t) \quad (4)$$

then, $$\alpha \propto (J_A-J_B) = 2af(t), \quad (5)$$

where $a$ is an arbitrary constant and $f(t)$ defines a predetermined time varying current function. Thus, the output beam will be scanned with $\sin \beta$ approximately proportional to $f(t)$. It should be noted that $2\pi/N$ is the phase change in $\alpha$ required to move the beam to a new position which is clearly resolvable from the prior one. Hence, the total number of resolvable spots is $N$ if $d > \lambda/2$.

In a similar manner, controlled phase shifts can be used to produce a laser having a variable beam width by making the phase difference between successive parallel stripe lasers vary with transverse position along the array. Thus, each pair of adjacent laser beams will constructively interfere in slightly different directions, thereby leading to a broader beam. Varying phase differences (as contrasted with the constant phase difference utilized in the scanning laser of FIG. 2B) can be produced as shown in FIG. 3A by making the physical separation between the two sets 70 and 80 of complementary contacts obey a nonlinear relationship, shown illustratively to be a parabola in FIG. 3B.

$$\left(\text{i.e., } l = \left(w - \frac{W}{2}\right)^2 + l_0\right).$$

As before, the contact segments within each set are electrically connected together, and if the current densities under each set are given by equations (3) and (4), the beam width will be a function of $f(t)$. The exact function depends on the shape of the function shown in FIG. 3B which can be appropriately chosen for operational or design purposes using antenna array theory by those skilled in the art without departing from the spirit and scope of the invention. The minimum beam width under these circumstances is for $f(t)=0$.

Figure 3A:
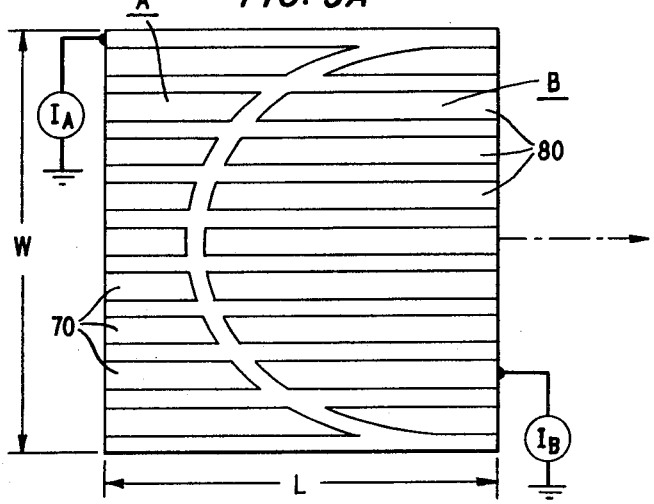
FIG. 3A is a top view of a contact array for varying the beam width of a plurality of optically coupled junction lasers in accordance with yet another embodiment of our invention.
Figure 3B:
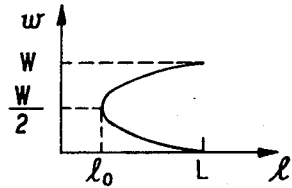
FIG. 3B is a graph of the parabolic function obeyed by the physical separation of the contact sets shown in FIG. 3A.

In each of the devices shown in FIGS. 2A and 3A it is essential to maintain electrical isolation between each set of contacts. Consequently, in fabricating these devices for c.w. operation, it may be advisable to bond the heat sink (which is typically electrically conducting) to the n-side (e.g., FIG. 1, layer 14), the latter having been lapped down to improve heat flow properties. Alternatively, separate electrically insulated heat sinks may be bonded or otherwise coupled to each of the contact sets on the p-side. Another heat sinking technique well known in the art which enables the stripes to be accessed independently employs, for example, a diamond heat sink on which are deposited gold stripe contacts. The latter are bonded by thermal compression to matched electrically independent stripes on the p-side of the laser diode.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, it will be appreciated that the appropriate stripe width and separation for diodes with a different degree of inhomogeneity, fabricated of other materials or with other junction depths, for example, can be readily determined empirically by those skilled in the art without the exercise of invention. Moreover, the principles of this invention can be readily applied to bulk semiconductor lasers which are pumped by an optical or electron source.

What is claimed is:

1. An optical scanner comprising, in combination,
    a body of semiconductor material having a pair of spaced parallel reflecting surfaces forming an optical cavity resonator therebetween for sustaining radiation generated by stimulated emission in said body, at least one of said reflecting surfaces being partially transmissive to permit egress of output radiation from said resonator, said body comprising a first semiconductor layer of a first conductivity type, a second semiconductor layer of the opposite conductivity type contiguous with said first layer and forming therebetween a planar p-n junction disposed normal to said reflecting surfaces, said resonator having an optic axis extending normal to said reflecting surfaces and a transverse axis extending normal to said optic axis and parallel to said p-n junction, means for pumping said body to produce said stimulated radiation comprising means for forward biasing said p-n junction and for applying thereto current in excess of the lasing threshold, means for causing said output radiation to change the angle which it makes with said partially transmissive reflecting surface in response to an information signal $f(t)$ comprising a first and second plurality of parallel stripe electrical contacts disposed on a major surface of said body parallel to said optic axis and to said p-n junction, said first and second pluralities being electrically insulated from one another along a region defined by a linear relationship between the lengths of said contacts along said optic axis and the position of said contacts on said major surface along said transverse axis, each of the contacts in each of said pluralities of contacts being substantially rectangular in shape and having a corresponding complementary contact in the other of said pluralities, each of said contacts and its corresponding complementary contact lying along a common axis parallel to said optic axis, and the sum of the length of any one of said contacts in one of said pluralities and the length of the corresponding complementary contact in the other of said pluralities being equal to a constant, each of said contacts forming a separate one of a plurality of junction lasers and the separation of adjacent edges of said contacts being no more than about 12 $\mu$m so that the optical fields of adjacent lasers overlap and cause said lasers to phase lock to one another, a first current source connected in series with each of the contacts in one of said pluralities to produce in the region of said junction thereunder a current density $J_A = J_o + af(t)$ where $a$ is a constant, $f(t)$ defines the time variation of the amplitude of said information signal about an average current density level $J_o$, and a second current source connected in series with each of the contacts in the other of said pluralities to produce in the region of said junction thereunder a current density $J_B = J_o - af(t)$, thereby to scan the main lobe of said output radiation at an angle $\beta$ to the normal to said plurality transmissive reflecting surface as a function of said information signal $f(t)$, where $\sin \beta = \alpha\lambda/2\pi d$, $\lambda$ is the wavelength of the phase locked output radiation, $d$ is the distance between the centers of adjacent stripe contacts and $\alpha$, a constant phase difference between the outputs of adjacent ones of said lasers, is proportional to $(J_A - J_B) = 2af(t)$.

2. A variable beam width optical device comprising, in combination, a body of semiconductor material having a pair of spaced parallel reflecting surfaces forming an optical cavity resonator therebetween for sustaining radiation generated by stimulated emission in said body, at least one of said reflecting surfaces being partially transmissive to permit egress of output radiation from said resonator, said body comprising a first semiconductor layer of a first conductivity type, a second semiconductor layer of the opposite conductivity type contiguous with said first layer and forming therebetween a planar p-n junction disposed normal to said reflecting surfaces, said resonator having an optic axis extending normal to said reflecting surfaces and a transverse axis extending normal to said optic axis and parallel to said p-n junction, means for pumping said body to produce said stimulated radiation comprising means for forward biasing said p-n junction and for applying thereto current in excess of the lasing threshold, means for causing the width of the main lobe of said output radiation to change in response to an information signal $f(t)$ comprising a first and second plurality of parallel stripe electrical contacts disposed on a major surface of said body parallel to said optic axis and to said p-n junction, said first and second pluralities being electrically insulated from one another along a region defined by a parabolic relationship between the lengths of said contacts along said optic axis and the position of said contacts on said major surface along said transverse axis, said parabolic relationship being symmetrical with respect to said optic axis, each of the contacts in each of said pluralities of contacts being substantially rectangular in shape and having a corresponding complementary contact in the other of said pluralities, each of said contacts and its corresponding complementary contact lying along a common axis parallel to said optic axis, and the sum of the length of any one of said contacts in one of said pluralities and the length of the corresponding complementary contact in the other of said pluralities being equal to a constant, each of said contacts forming a separate one of a plurality of junction lasers and the separation of adjacent edges of said contacts being no more than about 12 $\mu$m so that the optical fields of adjacent lasers overlap and cause said lasers to phase lock to one another, a first current source connected in series with each of the contacts in one of said pluralities to produce in the region of said junction thereunder a current density $J_A = J_o + af(t)$ where $a$ is a constant, $f(t)$ defines the time variation of the amplitude of said information signal about an average current density level $J_o$, and a second current source connected in series with each of the contacts in the other of said pluralities to produce in the region of said junction thereunder a current density $J_B = J_o - af(t)$, thereby to cause the phase difference between successive ones of said lasers to vary with position along said transverse axis and thereby to cause the width of said main lobe to change as a function of said information signal $f(t)$.

* * * * *